United States Patent [19]

West et al.

[11] 4,186,050
[45] Jan. 29, 1980

[54] NUCLEAR REACTORS

[75] Inventors: Gordon B. West, Rancho Santa Fe; Ralph H. Peters, Encinitas, both of Calif.

[73] Assignee: General Atomic Company, San Diego, Calif.

[21] Appl. No.: 908,065

[22] Filed: May 22, 1978

[51] Int. Cl.² ............................................... G21C 3/58
[52] U.S. Cl. ........................................ 176/62; 176/71; 176/89; 252/301.1 R
[58] Field of Search ............................... 252/301.1 R; 176/69–71, 89, 42, 62, 63, DIG. 1, 50

[56] References Cited

U.S. PATENT DOCUMENTS

| | | | |
|---|---|---|---|
| 3,019,176 | 1/1962 | McReynolds et al. | 176/69 |
| 3,127,325 | 3/1964 | Taylor et al. | 176/69 |
| 3,943,210 | 3/1976 | Vetrano | 252/301.1 R |

Primary Examiner—Harvey E. Behrend
Attorney, Agent, or Firm—Fitch, Even & Tabin

[57] ABSTRACT

A nuclear reactor having a large prompt negative temperature coefficient of reactivity. A reactor core assembly of a plurality of fluid-tight fuel elements is located within a water-filled tank. Each fuel element contains a solid homogeneous mixture of 50–79 w/o zirconium hydride, 20–50 w/o uranium and 0.5–1.5 w/o erbium. The uranium is not more than 20 percent enriched, and the ratio of hydrogen atoms to zirconium atoms is between 1.5:1 and 1.7:1. The core has a long lifetime, e.g., at least about 1200 MW days.

4 Claims, 3 Drawing Figures

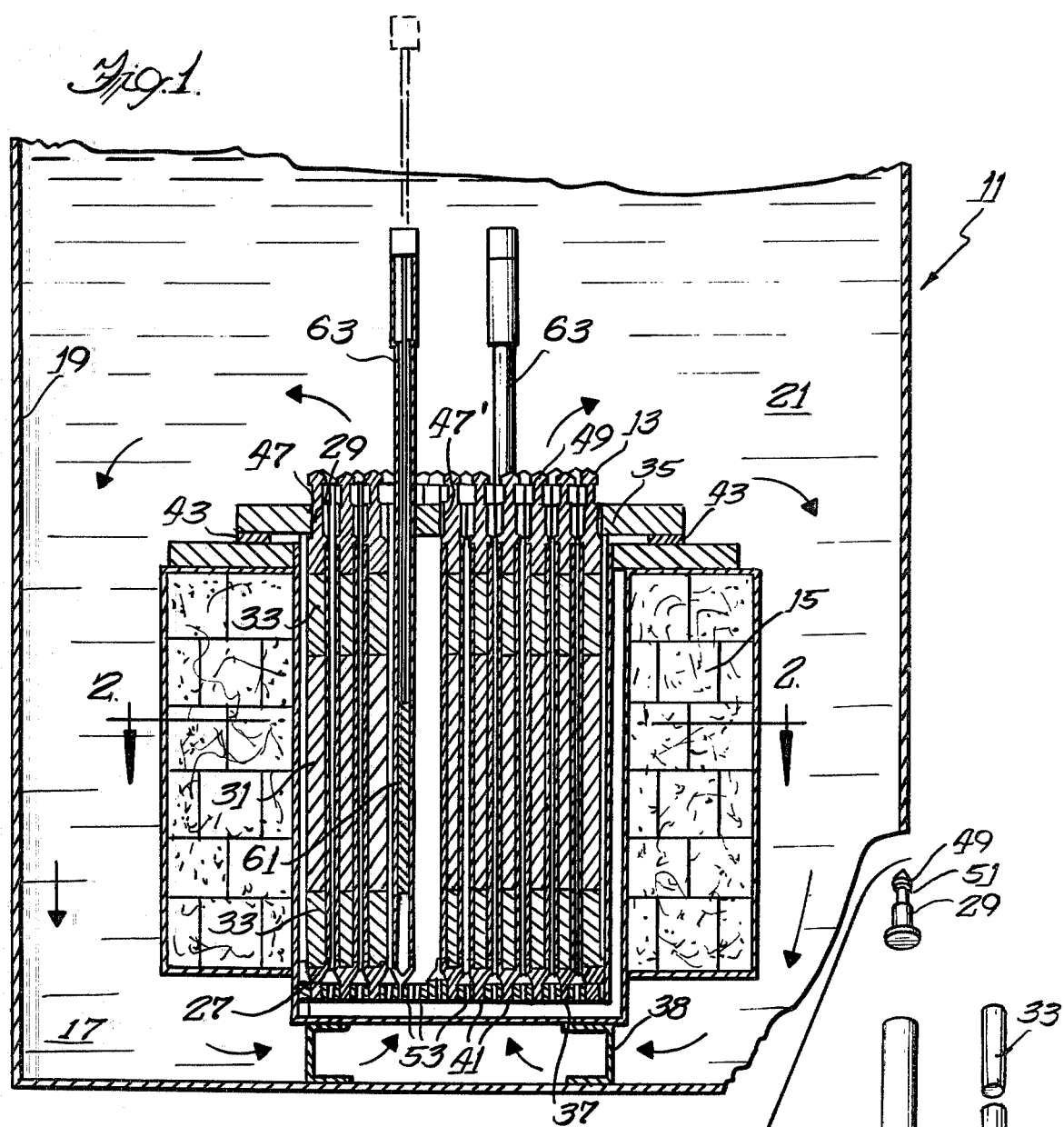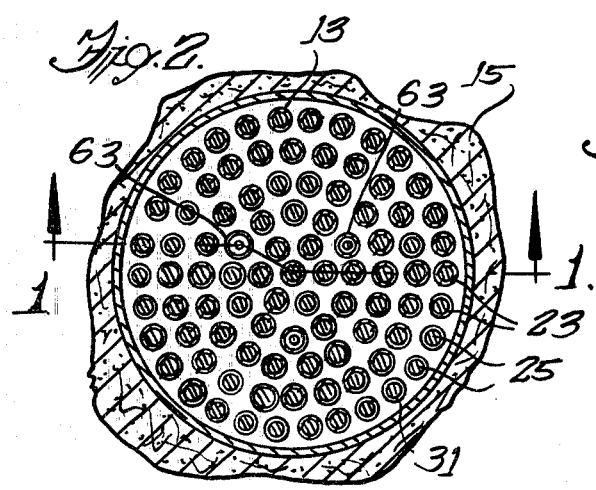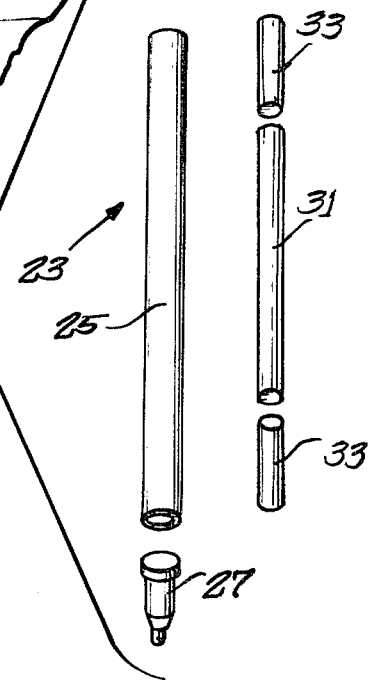

NUCLEAR REACTORS

The present invention relates generally to nuclear reactors and more particularly to a liquid-cooled nuclear reactor which incorporates an improved nuclear fuel.

The TRIGA research reactor, which was developed and is being marketed by the assignee of this application, is an inherently safe reactor utilizing a uranium-zirconium hydride fuel that has a large prompt negative temperature coefficient of reactivity, which is primarily characteristic of the fuel itself. The reactor is described in more detail in U.S. Pat. No. 3,127,325, issued Mar. 31, 1964, the disclosure of which is incorporated herein by reference. As a result of the inherent safety of the reactor core, a single or multiple control rod can be instantaneously removed from the core without having the resulting power pulse damage the core. In fact, one of the normal operating modes of the TRIGA reactor is termed the pulse mode, wherein such a fast ejection is performed in order to produce a high energy pulse of radiation for experimental purposes.

The temperature coefficient of the reactor is prompt because of the intimate mixture of the nuclear fuel with a large portion of solid moderator in the form of zirconium hydride. Thus, the fuel and solid moderator temperatures rise together instantaneously, with no heat transfer delays before the occurrence of moderator-related temperature coefficient effects. The prompt negative temperature coefficient for TRIGA reactors is considered to be a result of the following three contributing components: (1) thermal neutron spectrum hardening effects, (2) Doppler broadening of resonances and (3) neutron leakage from the reactor core. In the standard TRIGA reactors operating throughout the world today, the thermal spectrum hardening effects contribute the largest share to the total prompt negative temperature coefficient. The extensive thermal spectrum hardening is caused by the unique neutron-moderating characteristics of zirconium hydride. As neutrons gain energy from the spectrum hardening, the probability of their escape from the fuel element before being captured in the fuel is significantly increased. As a result, the ratio of neutron absorptions in the fuel to total absorptions in the core unit cell decreases as the temperature is increased, and this manifestation is termed the "cell effect".

The standard TRIGA fuel elements employed in these reactors contain a homogeneous mixture of about 8.5 weight percent low-enriched uranium and about 91.5 weight percent zirconium hydride, wherein the uranium contains about 20 percent U-235 and about 80 percent U-238. In such reactors utilizing these standard TRIGA fuel elements, more than 50 percent of the prompt negative coefficient results from the phenomenon of thermal spectrum hardening whereas the remaining amount is contributed about equally by the other two factors.

For applications where a long burn-up lifetime of fuel is deemed economically desirable, a fuel referred to as TRIGA-FLIP (Fuel Lifetime Improvement Program) was developed. This fuel is designed to be usable in the standard TRIGA reactors, as well as in other similar pool-type research reactors, and it uses 70 percent enriched uranium (i.e., 70 percent of the atoms were U-235). The FLIP fuel is a homogeneous mixture of about 8.5 weight percent uranium, about 1.6 weight percent erbium and the remainder zirconium hydride. The erbium is a strong contributor to the prompt negative temperature coefficient as a result of the interaction of its low energy resonances and the spectrum hardening effects of the zirconium hydride. It also serves as a burnable poison to compensate for the excess reactivity provided by the high-enriched uranium and thus maintains the reactivity balance of the fuel relatively flat throughout the lifetime of the overall reactor core loading.

The TRIGA-FLIP fuel elements also demonstrate inherent safety characteristics, similar to the standard TRIGA fuel elements. In the FLIP fuel core, an even greater percentage of the prompt negative temperature coefficient is contributed by thermal spectrum hardening, i.e., an amount of more than 85 percent. The contribution to the coefficient by the Doppler effect decreases slightly, and the contribution resulting from the increase in thermal neutron leakage decreases by about 75 percent. Because these decreases are more than offset by the increase resulting from thermal spectrum hardening, the overall prompt negative temperature coefficient of a FLIP fuel core is equal to or slightly greater than that of a reactor operating with the standard TRIGA fuel core.

The United States Government is presently pressing forward with non-proliferation policies which place limits upon the amount of enrichment that may be included within nuclear reactor fuel. In accord with these policies, 70 percent enriched fuel may not continue to be supplied. Accordingly, it is an object of the invention to provide an improved long-life reactor core for a pool-type reactor, such as the TRIGA, which utilizes low-enriched uranium but which also exhibits the desired prompt negative temperature coefficient. It is a further objective to provide fuel elements which can be employed in existing TRIGA reactors to provide a long-life fuel core without the incorporation of highly enriched uranium.

It has been found that a pool-type reactor, such as a TRIGA reactor, can be provided with a long-life reactor core loading by fabricating nuclear fuel elements from a homogeneous mixture including between about 20 and about 50 weight percent of low-enriched uranium, which for purposes of this application is defined as having not more than about 20 percent enrichment. By homogeneously mixing this uranium with zirconium hydride and with a small amount of erbium, preferably between about 0.5 and about 1.5 weight percent, it has been found that the resulting core unexpectedly has a prompt negative temperature coefficient which compares very favorably with that of a reactor fueled with standard TRIGA fuel. Past experience had indicated that a reactor core of this proportion would have a sizeably reduced prompt negative temperature coefficient compared with a reactor incorporating the standard TRIGA fuel because: (1) the large increase in the amount of uranium-235 would drastically reduce the cell effect, i.e., the thermal neutron leakage from the fuel-moderator material to the surrounding coolant, (2) the larger amount of uranium would considerably reduce the total amount of zirconium hydride in the fuel elements and thus the amount of hydrogen, the moderating effect of which is one of the major factors in the mechanism for creating a large prompt negative temperature coefficient, and (3) the decrease of the amount of hydrogen in the fuel mixture also decreases the overall reactivity of the core assembly and thus would substantially lessen the amount of erbium that could be added to contribute to the prompt negative temperature coefficient, thereby offsetting some of the losses incurred by items (1) and (2), and to offset excess reactivity.

In the drawings:

FIG. 1 is a vertical sectional view through the core of a TRIGA reactor, taken generally along line 1—1 of FIG. 2;

FIG. 2 is a horizontal sectional view taken generally along the line 2—2 of FIG. 1; and FIG. 3 is an exploded view of one of the fuel elements shown in FIG. 1.

Illustrated in the drawings is a TRIGA reactor 11 designed to operate at a steady state power level up to about 2 MW with natural-convection core cooling. With forced flow cooling, steady state power levels substantially higher can be achieved.

The reactor 11 includes a core assembly 13 which is surrounded by an annular graphite reflector 15. The core assembly 13 is located in a bottom portion of a vertically extending reactor tank 19 which holds a pool 21 of a liquid coolant-moderator, usually water. The reactor tank 19 may be cylindrical.

The core assembly 13 is made up of a plurality of vertically extending fuel elements 23 which are located in a predetermined spatial array, as best seen in FIG. 2. Each fuel element 23, as depicted in FIG. 3, includes a fluidtight tubular shell 25 made of a material such as stainless steel or Incoloy. The bottom of each tube 25 is closed with a stainless steel bottom end fixture 27, and its top is similarly closed by a stainless steel top end fixture 29. A representative fuel element 23 for the illustrated reactor employs a stainless steel cladding 25 about 0.02 inch in thickness (about 0.5 mm.) which contains a central fuel body 31 about 15 inches (about 38 cm.) in length having a diameter of about 1.43 inches (36.3 mm.). Although illustrated as a single rod, the fuel body 31 may be made of a plurality of shorter compacts. The fuel body 31 is flanked by upper and lower internal graphite reflectors 33 in the form of short graphite rods about 3.4 inches (8.64 cm.) in length.

As illustrated in FIG. 2, the fuel elements 23 extend vertically in a spatial array which is a plurality of uniformly spaced, concentric circles; however, other spatial arrays may also be used. The fuel elements 23 are maintained in the desired spaced relationship from one another within the core by upper and lower grid members 35,37. The lower grid member 37 is made of a suitable material, such as aluminum, and is supported spaced somewhat above the very bottom of the tank section 17 by a lower core assembly support 38. It contains a pattern of openings 41 which receive the depending pin portions of the bottom end fixtures 27. The upper grid member 35 is appropriately secured to the top of the reflector assembly 15 and is preferably spaced slightly above it by spacers 43 to facilitate coolant flow.

Openings 47 in the upper grid member 35 are of a diameter approximately equal to the outer diameter of the fuel elements 23 so that the fuel elements can be slideably lowered therethrough. The upper end of each top end fixture 29 is formed with a knob 49 which is designed for engagement by a fuel-element handling device. A flow area is provided in the top end fixture 29 in the region of the upper grid plate 35 to provide passageways for the coolant-moderator which is flowing upward out of the core.

Coolant flows downward in the pool outside the reflector portion of the reactor core and then inward through the support assembly 38 via natural convection.

In addition to the openings 41 in the lower grid plate 37 which receive the depending pin portions of the bottom end fixtures 27, there are additional openings 53 which permit the upward flow of the coolant-moderator through the lower grid plate and upward into the regions between adjacent fuel elements 23. The coolant-moderator is heated in the core assembly 13 by a heat-exchange with the fuel elements 23, and the lighter liquid rises rapidly into the pool 21 in the main section of the tank 19 above the core assembly.

To control the nuclear reaction within the core 13, a plurality of control rods 61 are provided (three are illustrated). The control rods 61 are movable upward and downward, slideably within three tubes 63 in the reactor core which occupy locations in the spatial array that would otherwise be occupied by fuel elements 23. The control rods 61 are vertically movable (as depicted in dotted outline) by mechanisms supported overhead of the tank 19 which are not shown and which do not form a part of the present invention.

In a reactor of this general type, the long-life low-enriched fuel elements 23 can be constructed so that the prompt negative temperature coefficient of reactivity may be greater than about $10 \times 10^{-5}/°C$. The fuel bodies 31 in each of the fuel elements 23 are made of a homogeneous mixture of uranium, zirconium hydride and erbium. The zirconium hydride is prepared in accordance with methods known in the art. The hydrogen to zirconium ratio is between about 1.5:1 and about 1.7:1, and preferably is about 1.6:1.

As previously indicated, the uranium which is used is low-enriched uranium, i.e., an enrichment of not greater than about 20 percent, and the weight percent of uranium in the fuel body 31 may vary from 20 weight percent to about 50 weight percent. The amount of erbium which is employed will be dependent upon the amount of excess reactivity that is present in the core assembly 13, and thus upon the weight percent of low-enriched uranium which is used. For example, if 20 weight percent of low-enriched uranium is employed, about 0.5 weight percent of erbium is used. If, for example, 30 weight percent low-enriched uranium is employed, about 0.9 weight percent of erbium is employed. The homogeneous mixture of the uranium, zirconium-hydride and erbium is critical to obtaining the prompt negative temperature coefficient of reactivity.

One example of such a reactor system contains a core assembly 13 made up of 100 fuel elements of the general type hereinbefore described which are located near the bottom of a pool of light water held by a tank 19 about 6 feet in diameter. The fuel elements 23 are uniformly arranged in an array having a diameter of about 20 inches (51 cm.), which is surrounded by a graphite reflector 15 made up of bricks of dense graphite having a thickness of abone one foot. The annular reflector 15 provides the same thickness of graphite all around the core assembly 13. These dimensions are the dimensions of a standard TRIGA reactor having a power of about 2 MW. In a reactor of this construction, the prompt negative temperature coefficient for a core made up of fuel elements employing 20 weight percent of the low-enriched uranium is about $10.5 \times 10^{-5}/°C$. which is greater than that of the standard TRIGA fuel. Generally, in a core-reflector arrangement such as that illustrated where the region interior of the reflector occupied by the assembly of elements is not greater than about 2 cubic feet for each thousand KW of rated power, the prompt negative temperature coefficient of reactivity will be about 8 to about $11 \times 10^{-5}/°C$. average over the operating temperature range.

Thus, by having the U-238 constitute a very large portion (about 80 percent) of the uranium in the fuel element (which themselves contain a high weight percent of uranium, i.e., 20 to 50 weight percent) and by adding a thermal resonance poison, namely erbium, as a part of the homogeneous fuel-moderator mixture, it was unexpectedly found that the total prompt negative temperature coefficient of reactivity of such a reactor core was larger than or at least nearly as large as that of a core assembly utilizing the standard TRIGA fuel, which contains about 8.5 weight percent of low-enriched uranium. In fact, the prompt negative temperature coefficient of a core assembly 13 containing fuel elements with 20 weight percent of the low-enriched uranium is about 10 percent higher than that of a core containing 8.5 weight percent uranium (standard TRIGA fuel). Similarly, the coefficient for a core assembly 13 containing 30 weight percent of the low-enriched uranium is only somewhat lower than the standard TRIGA core.

It was found that the loss in prompt negative temperature coefficient, compared to the standard TRIGA fuel core, which is caused by the increased U-235 content and by the reduction in the amount of hydrogen, is unexpectedly able to be more than completely offset, or almost completely offset, by the combination of the use of erbium plus the increase in the amount of U-238, the presence of which causes a significant increase in the Doppler broadening effect. Surprisingly, this is achieved with a significantly lesser amount of erbium than that which was present in the TRIGA-FLIP fuel. As a result, the precise combination of low-enriched uranium, plus $ZrH_{1.6}$, plus a minor amount of erbium, usually less than 1 weight percent, surprisingly provides a substitute core for the standard TRIGA reactor which will have both long life, e.g., at least about 1200 MW days, plus a prompt negative temperature coefficient of reactivity which gives it inherent safety.

Although the invention has been described with regard to certain preferred embodiments, it should be understood that various modifications and changes as would be obvious to one having the ordinary skill in the art may be made without departing from the scope of the invention which is defined solely by the appended claims. For example, the fuel elements could be in the form of plates instead of being tubular in shape. Moreover, should smaller diameter fuel elements be used, for example one-half inch diameter which include 45 w/o uranium, the core might only have a prompt negative temperature coefficient of about $5 \times 10^{-5}/°C$. which would be acceptable under some circumstances. Various of the features of the invention are emphasized in the claims which follow.

What is claimed is:

1. A nuclear reactor having a large prompt negative temperature coefficient of reactivity, which reactor comprises a reactor tank, a quantity of water in said tank which serves both as coolant and as moderator, a reactor core assembly within the water in said tank which includes a plurality of fluid-tight fuel elements which are spaced within said tank to provide liquid-flow passageways surrounding each of said elements, means for permitting water to flow through said passageways in heat-exchange relationship with the surfaces of said elements, each of said elements containing a solid homogeneous mixture of zirconium hydride, uranium and erbium, wherein the improvement comprises, said uranium constituting between about 20 and about 50 weight percent of said mixture, said zirconium hydride constituting between about 79 and about 50 weight percent of said mixture and said erbium constituting between about 0.5 and about 1.5 weight percent of said mixture, said uranium in said mixture being not greater than about 20 percent U-235 with the remainder substantially U-238, the ratio of hydrogen atoms to zirconium atoms being between about 1.5:1 and about 1.7:1, and said erbium being distributed uniformly throughout said uranium-zirconium hydride mixture.

2. A nuclear reactor in accordance with claim 1 wherein said reactor includes a vertically extending tank and a reflector surrounding said core assembly, and wherein the region of said tank interior of said reflector which is occupied by said core assembly is not greater than about two cubic feet for each one thousand KW of rated power.

3. A nuclear reactor in accordance with claim 1 wherein the prompt negative temperature coefficient of reactivity is at least about $5 \times 10^{-5}/°C$. averaged over the operating temperature range.

4. A nuclear reactor in accordance with claim 1 wherein the core has a burn-up life of at least about 1200 NW days.

* * * * *